July 5, 1949.  A. CHILTON  2,475,011
CRANKSHAFT AND CAM DRIVE CONSTRUCTION

Filed Oct. 21, 1944  2 Sheets-Sheet 1

INVENTOR.
ALLAN CHILTON.
BY
ATTORNEY

July 5, 1949.  A. CHILTON  2,475,011
CRANKSHAFT AND CAM DRIVE CONSTRUCTION
Filed Oct. 21, 1944  2 Sheets-Sheet 2

INVENTOR.
ALLAN CHILTON
BY
ATTORNEY

Patented July 5, 1949

2,475,011

UNITED STATES PATENT OFFICE 2,475,011

CRANKSHAFT AND CAM DRIVE CONSTRUCTION

Allan Chilton, Ridgewood, N. J., assignor to Wright Aeronautical Corporation, a corporation of New York Application October 21, 1944, Serial No. 559,744

4 Claims. (Cl. 74—55)

This invention relates to internal combustion engines, and is particularly directed to a crank shaft construction and to a valve gear cam drive in combination therewith.

It is an object of this invention to provide a sectional crank shaft in which the sections are secured together by a clamp joint and in which the clamp joint itself comprises a bearing journal for the crank shaft. In a multi-section two throw crank shaft, it is conventional practice to make the crank shaft in three sections comprising front and rear sections each clamped to an intermediate section which includes the two crank pins and which provides a bearing journal between the two crank pins. It is a further object of this invention to provide a two throw crank shaft comprising but two sections with a single clamp joint between the two crank pins and in which a bearing journal is secured to and is disposed about the clamp joint.

In a radial cylinder engine, the valve operating cams comprise a series of cam lobes on the outer periphery of an annular member geared to the crank shaft. It is a further object of this invention to eliminate this gear connection to the crank shaft by providing a plurality of planet pinions on the aforementioned clamp joint for driving the annular valve operating cam member.

Other objects of this invention will become apparent upon reading the annexed detailed description in connection with the drawing in which:

Figure 3 is a face view of the clamp joint along line 3—3 of Figure 2; and

Figure 4 is a sectional view on line 4—4 of Figure 3.

Figure 1:
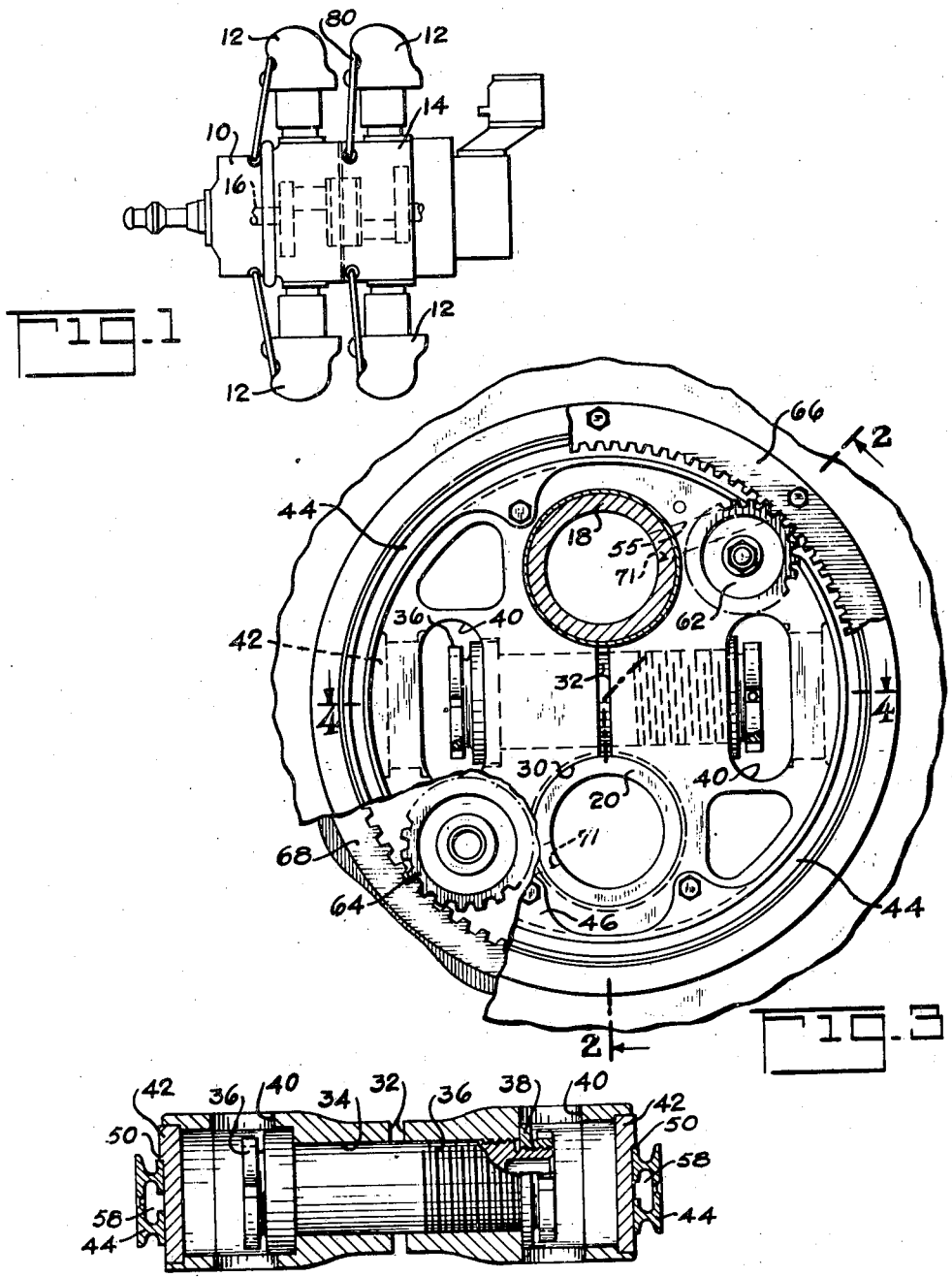
Figure 1 is a schematic side elevation of a two-bank radial cylinder engine.

Referring to the drawing, 10 illustrates a radial cylinder engine comprising two banks of cylinders 12, radially disposed about a crank case 14. A two-throw crank shaft 16 is journaled within the crank case and is provided with a crank pin 18 serving the first bank of cylinders, and a crank pin 20 serving the second bank, said crank pins being diametrically opposed as illustrated in Figure 3. A master connecting rod 22 is journaled about each crank pin, and a plurality of auxiliary connecting rods 24 are pivotally connected to each master rod in the usual manner.

Figure 2:
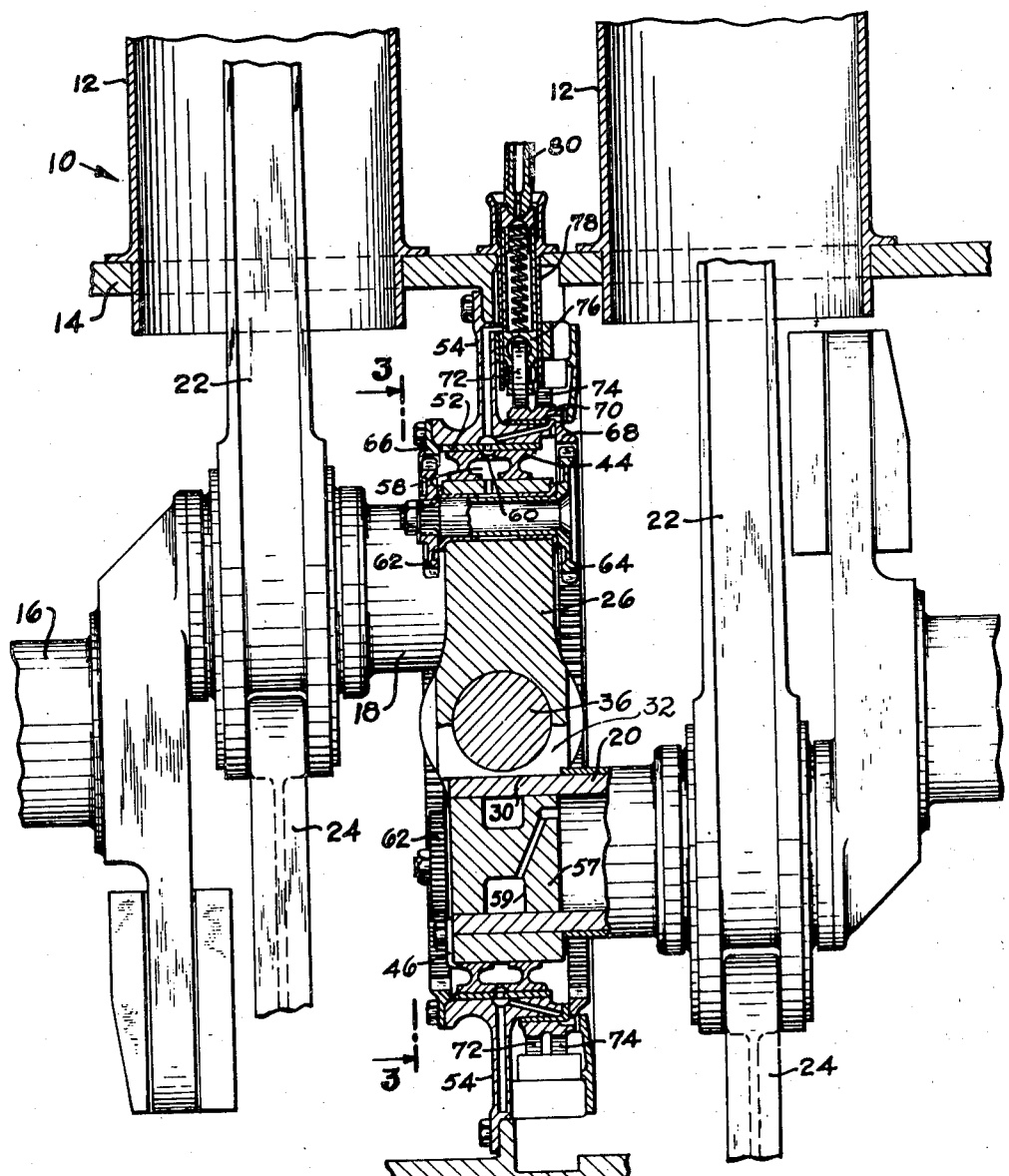
Figure 2 is an axial section through a portion of the engine of Figure 1 taken along line 2—2 of Figure 3.

The crank shaft 16 comprises two sections clamped together between its crank pins 18 and 20 by a clamp-joint-type crank cheek 26. The crank cheek 26 comprises a cylindrical member having a pair of through openings 30 (but one of which appears in Figure 2) for receiving the crank pins 18 and 20 respectively. In addition, the crank cheek 26 is split as indicated at 32 between the pair of openings 30 in a plane defined by the axes of said openings and the crank shaft axis whereby the crank cheek may be tightly drawn about each crank pin by drawing the facing surfaces of the split 32 together. For this purpose, the crank cheek is provided with a drilling 34 transverse to its axis and midway between the pair of crank pin openings 30 for the reception of a bolt 36 and a lock nut 38. On one side of the split 32, the drilling 34 is threaded whereby the bolt 36 is adapted to draw together the facing surfaces of the split 32 to tightly clamp the crank cheek about the crank pins. The sides of the crank cheek 26 are provided with through openings 40 to facilitate tightening or loosening of the nut 38 and the bolt 36. In addition, cap portions 42 close the outer end of the drilling 34 in order to provide a continuous cylindrical outer surface.

An annular member 44 of inwardly opening channel-shaped cross section is provided with in-turned ears 46 for securing it about the outer periphery of the cylindrical crank cheek 26. Each of the cap portions 42 is provided with a shoulder 50 to facilitate alignment of the member 44 about the periphery of the clamp joint. The member 44 is adapted to be journaled within a bearing 52 carried by the crank case supporting web 54. To this end the crank cheek 26 is designed to be cylindrical after it has been tightly clamped about the crank pins 18 and 20. With this construction the split clamp joint 26 clamps the two crank pins together by providing a crank cheek construction therebetween, and in addition, the clamp joint provides a bearing journal supported by the crank case.

As in the usual crank shaft construction, the crank pins are hollow, and engine lubricating oil is supplied thereto for lubrication of the master rod bearing. In order to lubricate the crank shaft bearing 52, the clamp joint is provided with a pair of drillings 55 (only one of which is shown) respectively extending from the pair of crank pin openings 30 and communicating with the annular space 58 defined by the inwardly opening channel-spaced member 44 about the clamp joint member 26. Also a plug 57, disposed in each crank pin, has an annulus 59 to which oil is supplied from the crank pin and each crank pin is provided with a radial drilling 71 establishing communication between the clamp joint drillings 55 and the interior of its associated crank pin through the annuli 59. With this construction, oil is supplied from the crank pins and their drillings 71 through clamp joint drillings 55 to the annular space 58, and thence through radial openings 60 for lubricating the crank shaft bearing 52.

A plurality of double pinions 62, 64 rotationally rigid relative to each other are journaled on the clamp joint member 26 and disposed around its periphery. The pinions 62 are disposed in engagement with a fixed internal ring gear 66 bolted to the crank case web 54, while the pinions 64 are disposed in engagement with an internal ring gear 68 integrally formed with an annular cam member 70. With this construction, upon rotation of the crank shaft, pinions 62, 64 rotate with the clamp joint member 26, thereby drivably rotating the annular cam member 70. The cam member 70 is of the usual construction, and is provided with a series of circumferentially spaced cam lobes adapted to actuate the intake valve cam follower rollers 72 serving at least one bank of engine cylinders. In addition, the annular cam member 70 is provided with a second series of circumferentially spaced cam lobes adapted to actuate the exhaust valve cam follower rollers 74. Each of the cam follower rollers is carried by a valve tappet 76 slidably mounted within a guide 78 secured to the crank case and engageable with one end of a valve operating push rod 80 in the usual manner. The upper end of the push rod 80 is engageable with one end of the usual rocker arm (not shown) for operating a cylinder valve.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications.

I claim as my invention:

1. In combination, a multi-section multi-throw crank shaft, a member providing a clamp joint between a pair of adjacent diametrically opposed crank pins of said shaft, said clamp joint member having a pair of diametrically opposed through openings each being adapted for clamping engagement about one of said crank pins, said member being split between said openings to provide a narrow channel through said member between said openings, means adapted to draw the walls of each of said openings about its associated crank pin, and an annular crank shaft bearing journal disposed about and carried by said member.

2. In combination, a multi-section multi-throw crank shaft, a member providing a clamp joint between a pair of adjacent crank pins of said shaft, said clamp joint member having a pair of through openings each being adapted for clamping engagement about one of said crank pins, said member being split between said openings to provide a narrow channel through said member between said openings, a single bolt adapted to draw the sides of said channel together to clamp the walls of each of said openings about its associated crank pin, and an annular crankshaft bearing journal disposed about and carried by said member.

3. In combination, a multi-section multi-throw crankshaft, a member providing a clamp joint between a pair of adjacent crankpins of said shaft, said clamp joint member having a pair of through openings each adapted for clamping engagement about one of said crankpins, said member being split between said openings to provide a narrow channel through said member between said openings, means for drawing the walls of said openings about their associated crankpins, an annular crankshaft bearing journal disposed about and carried by said member, and means mounted on said member for driving engine valve-operating cam means therefrom.

4. In combination, a multi-section multi-throw crankshaft, a member providing a clamp joint between a pair of adjacent crankpins of said crankshaft, said clamp joint member having a pair of through openings each adapted for clamping engagement about one of said crankpins, said member being split to provide a channel through said member between said openings, means for drawing the walls of said openings about their associated crankpins, an annular crankshaft bearing journaled about and carried by said member, one or more double planet pinions carried by said member, a fixed ring gear in engagement with one pinion of each of said double pinions, a rotatable ring gear in engagement with the other pinion of each of said double pinions, and engine valve-operating cam means driven by said rotatable ring gear.

ALLAN CHILTON.

REFERENCES CITED

The following references are of record in the file of this patent:

UNITED STATES PATENTS

| Number | Name | Date |
|---|---|---|
| 1,067,666 | Laviolette | July 15, 1913 |
| 1,363,466 | Glor | Dec. 28, 1920 |
| 1,431,416 | Parsons et al. | Oct. 10, 1922 |
| 1,609,361 | Jones | Dec. 7, 1926 |
| 2,057,164 | Rockwell | Oct. 13, 1936 |
| 2,154,359 | Sarazin | Apr. 11, 1939 |
| 2,256,094 | Lynch | Sept. 16, 1941 |

FOREIGN PATENTS

| Number | Country | Date |
|---|---|---|
| 291,274 | Great Britain | May 31, 1928 |
| 398,380 | Great Britain | Sept. 14, 1933 |